Oct. 19, 1965   J. HENLE   3,212,181
METHOD OF LOCATING DRILL JIG PARTS IN MAKING A DRILL JIG
Filed May 14, 1962
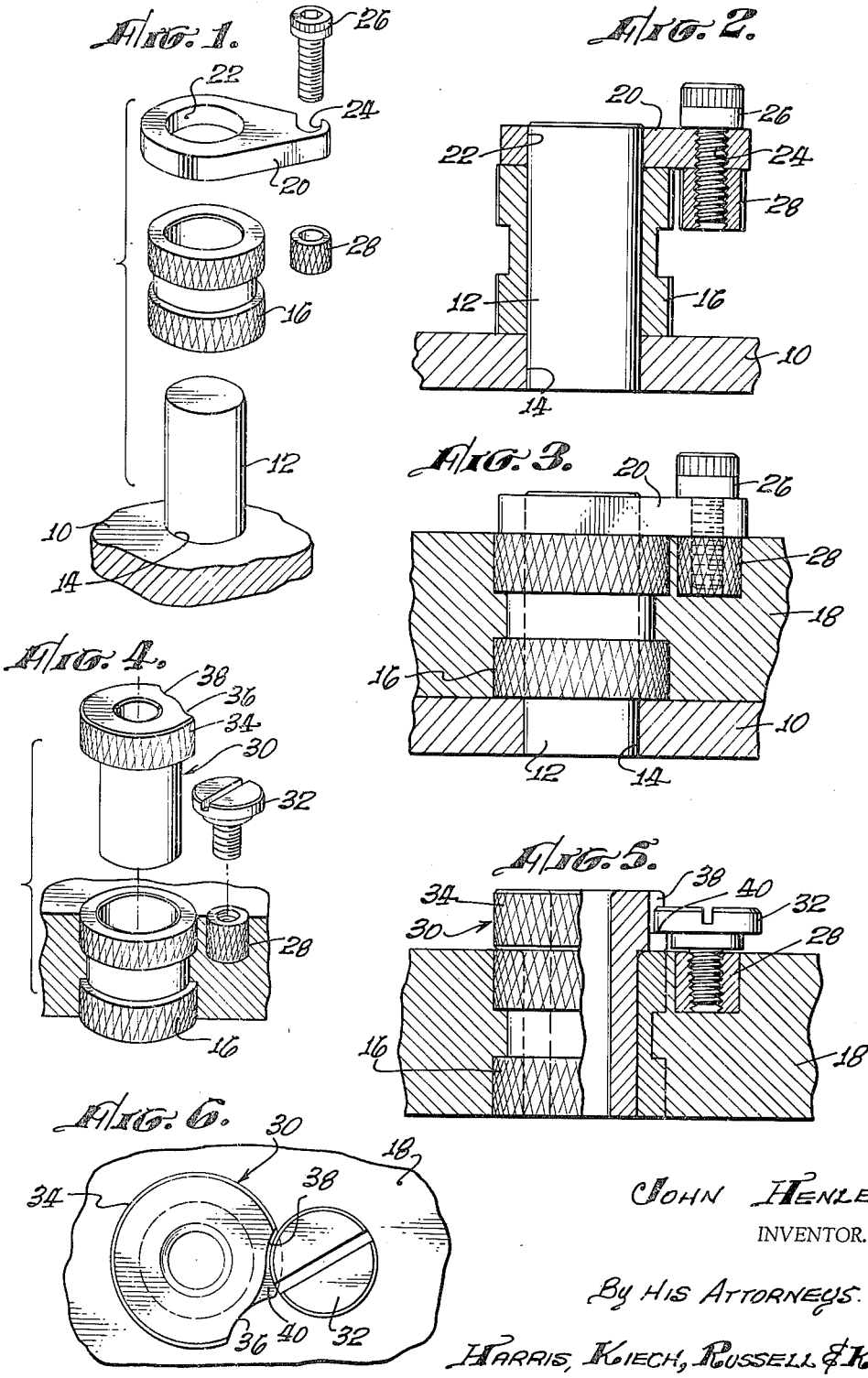
John Henle,
INVENTOR.
By His Attorneys.
Harris, Kiech, Russell & Kern

United States Patent Office 3,212,181
Patented Oct. 19, 1965

3,212,181
METHOD OF LOCATING DRILL JIG PARTS IN MAKING A DRILL JIG
John Henle, Sherman Oaks, Calif., assignor to Ace Drill Bushing Co., Inc., Los Angeles, Calif., a corporation of California
Filed May 14, 1962, Ser. No. 194,491
3 Claims. (Cl. 29—468)

The present invention relates in general to drill jigs and, more particularly, to a drill jig of the type which includes a replaceable drill bushing telescoped into a liner and secured in position by a lock screw alongside one end of and parallel to the liner.

One prior drill jig of the foregoing nature comprises a steel jig plate, or the like, into which the liner is pressed, the lock screw for securing the drill bushing in position being threaded into a hole tapped into the steel jig plate.

A primary object of the invention is to provide an accurate, effective, simple and inexpensive method of and means for locating or positioning a drill-bushing lock screw relative to a drill bushing liner quickly and easily.

More particularly, an important object of the invention is to provide a drill jig wherein the liner and a lock screw bushing, adapted to have the lock screw threaded thereinto, are cast into a jig plate formed of a suitable potting material in side-by-side, parallel relation with the lock screw bushing laterally opposite one end of the liner and spaced a predetermined distance therefrom. The potting material may, for example, be a synthetic resin such as: epoxy, or epoxy intermixed with glass fabric; or it may be any of various castable metallic alloys.

Another object of the invention is to provide a method of and apparatus for casting the liner and the lock screw bushing in their proper relative positions quickly and accurately.

A further object of the invention is to locate the drill bushing liner by telescoping it over a liner locating pin carried by a jig base plate of any suitable material, the liner being seated on the jig base plate.

Yet another object is to properly locate the lock screw bushing relative to the liner by telescoping a template onto the liner locating pin, inserting a locating screw through the template the required distance from the liner, and threading the lock screw bushing onto the locating screw to secure it in the correct relative position with respect to the liner.

Another and important object of the invention is to subsequently cast the liner and the lock screw bushing in a suitable potting material, utilizing the jig base plate as the bottom wall of a form for the potting material.

Once the potting material has set or cured, or has been set or cured, it provides a jig plate in which the liner and lock screw bushing, or a plurality of sets of liners and corresponding lock screw bushings, are embedded. After removal of the locating screw and the template and after separation of the cast jig plate from the jig base plate and the locating pin, a drill bushing is inserted into the liner and a lock screw is threaded into the lock screw bushing to lock the drill bushing in place. The drill jig is then completed and ready for use.

The foregoing objects, advantages, features and results of the present invention, together with various other objects, advantages, features and results thereof which will be evident to those skilled in the drill jig art in the light of this disclosure, may be achieved with the exemplary embodiment of the invention described in detail hereinafter and illustrated in the accompanying drawing, in which:

FIG. 1 is an exploded perspective view of an apparatus or means of the invention for relatively locating a drill bushing liner and a lock screw bushing;

FIG. 2 is a longitudinal sectional view illustrating the components of the locating means in assembled relation;

FIG. 3 is a view generally similar to FIG. 2, but showing the drill bushing liner and the lock screw bushing cast into a jig plate of a suitable potting material;

FIG. 4 is an exploded perspective view showing the drill jig of FIG. 3 separated from the locating means for the drill bushing liner and the lock screw bushing, and showing a drill bushing and a lock screw to be inserted into the drill bushing liner and the lock screw bushing, respectively;

FIG. 5 is a view, partially in longitudinal section and partially in side elevation, showing the drill bushing and lock screw of FIG. 4 in place in the drill bushing liner and the lock screw bushing, respectively; and FIG. 6 is a fragmentary plan view of the components shown in FIG. 5 of the drawing.

Referring initially to FIG. 1 of the drawing, the numeral 10 designates a jig base plate, or the like, having a drill-bushing locating pin 12 thereon. This locating pin is perpendicular to the base plate 10 and may be pressed into a bore 14 therein, as shown.

Referring to FIG. 2 of the drawing, the locating pin 12 is adapted to have a drill bushing liner 16 telescoped thereonto and seated on the base plate 10. The liner 16 is annularly grooved externally thereof, and is externally knurled, or otherwise roughened, to key it in place in a cast jig plate 18 (FIG. 3) formed during a subsequent casting or potting operation.

Telescoped onto the locating pin 12 and seated on the liner 16 is a template 20. This template is provided with a locating bore 22 therethrough for the locating pin 12.

Spaced laterally from the locating bore 22 in the template 28 a predetermined distance is a locating hole, shown as a notch 24, for a locating screw 26 adapted to have a lock screw bushing 28 threaded thereonto. As will be apparent, the locating screw 26 clamps the lock screw bushing 28 against the template 20 in such a position that the lock screw bushing is laterally opposite one end of the liner 16, is parallel to the liner, and is spaced laterally from the liner a predetermined distance. The lock screw bushing 28 is also externally knurled, or otherwise roughened, to secure a good mechanical interlock between the lock screw bushing and the jig plate 18.

The foregoing operations completed, a suitable potting material, of the nature previously outlined, is poured onto the jig base plate 10, using the jig base plate as a bottom wall of a mold for the potting material, and around the liner 16 and the lock screw bushing 28. Subsequently, the potting material is permitted to cure or set, or is cured or set, to permanently embed the drill bushing liner 16 and the lock screw bushing 28 in the jig plate 18.

Upon completion of the foregoing operations, the locating screw 26 and the template 20 are removed, and the finished jig plate 18 is separated from the jig base plate 10 and the locating pin 12. While the jig plate 18 has been shown as provided with only one drill bushing liner 16 and one lock screw bushing 28, it will be understood that the jig plate may be provided with any desired number of sets of drill bushing liners and lock screw bushings, depending upon the particular use to be made of the jig plate.

Referring to FIGS. 4 to 6 of the drawing, after removal of the template 20 and the locating screw 26, and after separation of the jig plate 18 from the base plate 10 and the locating pin 12, a drill bushing 30 is inserted into the liner 16 and locked in place by a lock screw 32 threaded into the bushing 18. The drill bushing 30 is provided at its upper end with an annular head 34 seatable on the upper end of the liner 16. The head 34 is provided with a notch 36 which may be aligned with the head of the lock screw 32 to permit insertion and/or removal of the drill bushing 30 without removal or loosening of the lock screw. Communicating with the notch 36 is a notch 38 which extends only part way through the head 34 in the longitudinal direction, thereby providing a shoulder 40 on which the head of the lock screw 32 is seatable. As will be apparent, the drill bushing 30 is installed by inserting it into the liner 16 with the notch 36 in alignment with the head on the lock screw 32. Thereafter, the drill bushing 30 is rotated to insert the shoulder 40 under the head on the lock screw 32.

As will be apparent from the foregoing description, the present invention provides a rapid, inexpensive and accurate way of making up a jig plate 18 which does not involved drilling and tapping any hole for the lock screw 32, the lock screw bushing 28 automatically being cast into the jig plate in the correct position by the template 20.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. A method of locating an externally roughened liner and an externally roughened, internally threaded, lock screw bushing of a drill jig in side-by-side, parallel relation a predetermined distance apart with said lock screw bushing laterally opposite one end of said liner, said method being characterized by the use of a jig base plate having a liner locating pin thereon, a template telescopable onto said locating pin, and a locating screw insertable through said template said predetermined distance from said locating pin and threadable into said lock screw bushing, said method including the steps of:
    (a) telescoping said liner onto said locating pin and seating it on said jig base plate;
    (b) telescoping said template onto said locating pin and seating it on said liner; and
    (c) inserting said locating screw through said template and threading it into said lock screw bushing to secure said lock screw bushing to said template said predetermined distance from said liner.

2. A method of permanently locating a drill bushing liner and an internally threaded, lock screw bushing of a drill jig in side-by-side, parallel relation a predetermined distance apart with said lock screw bushing laterally opposite one end of said liner, said method being characterized by the use of a jig base plate having a liner locating pin thereon, a template telescopable onto said locating pin, and a locating screw insertable through said template said predetermined distance from said locating pin and threadable into said lock screw bushing, said method including the steps of:
    (a) telescoping said liner onto said locating pin and seating it on said jig base plate;
    (b) telescoping said template onto said locating pin and seating it on said liner;
    (c) inserting said locating screw through said template and threading it into said lock screw bushing to secure said lock screw bushing to said template said predetermined distance from said liner; and
    (d) casting said liner and said lock screw bushing in a potting material.

3. A method of making a drill jig which includes, among other elements, an externally roughened liner and an externally roughened, internally threaded, lock screw bushing to be permanently located in side-by-side, parallel relation a predetermined distance apart with said lock screw bushing laterally opposite one end of said liner, said method being characterized by the use of a jig base plate having a liner locating pin thereon, a template telescopable onto said locating pin, and a locating screw insertable through said template said predetermined distance from said locating pin and threadable into said lock screw bushing, said method including the steps of:
    (a) telescoping said liner onto said locating pin and seating it on said jig base plate;
    (b) telescoping said template onto said locating pin and seating it on said liner;
    (c) inserting said locating screw through said template and threading it into said lock screw bushing to secure said lock screw bushing to said template said predetermined distance from said liner;
    (d) casting said liner and said lock screw bushing in a potting material to form a cast jig plate;
    (e) unscrewing said locating screw from said lock screw bushing;
    (f) removing said template from said locating pin;
    (g) separating said jig base plate and said locating pin from said cast jig plate and said liner and lock screw bushing;
    (h) inserting a drill bushing into said liner; and
    (i) threading a lock screw into said lock screw bushing and into engagement with said drill bushing.

References Cited by the Examiner

UNITED STATES PATENTS

| | | | |
|---|---|---|---|
| 1,408,098 | 2/22 | Knapp et al. | 33—189 |
| 2,607,446 | 8/52 | Rosan. | |
| 2,698,547 | 1/55 | Armacost. | |
| 2,718,708 | 9/55 | Kalberer | 33—189 |
| 2,725,639 | 12/55 | Yungman. | |
| 2,915,926 | 12/59 | Woerner. | |
| 2,996,936 | 8/61 | Blaise | 77—62 |
| 3,015,242 | 1/62 | Armacost. | |

WILLIAM W. DYER, Jr., *Primary Examiner.*

ANDREW R. JUHASZ, J. SPENCER OVERHOLSER, FRANK H. BRONAUGH, *Examiners.*